United States Patent [19]

Inoue et al.

[11] Patent Number: 4,772,902
[45] Date of Patent: Sep. 20, 1988

[54] VIDEO CAMERA HAVING GRIP CONSTITUTED BY BATTERY

[75] Inventors: Yuzuru Inoue, Machida; Kazuo Koda, Yokohama; Akiyoshi Morita, Sagamihara; Toshiharu Hida, Machida; Shunichi Aoki, Sagamihara; Koichi Kimura, Fujisawa, all of Japan

[73] Assignee: Victor Company of Japan, Ltd., Japan

[21] Appl. No.: 57,484

[22] Filed: Jun. 3, 1987

[30] Foreign Application Priority Data

Jun. 5, 1986 [JP] Japan .............................. 61-85908[U]
Sep. 8, 1986 [JP] Japan ............................ 61-137759[U]

[51] Int. Cl.4 ..................... G03B 17/00; G11B 31/00; H04N 5/30
[52] U.S. Cl. ..................................... 354/82; 354/288; 354/293; 352/243; 358/229
[58] Field of Search ................. 354/82, 288, 293, 219; 352/242, 243; 358/229, 906, 909

[56] References Cited

U.S. PATENT DOCUMENTS

| 3,508,482 | 4/1970 | Taylor | 354/82 |
| 3,519,341 | 7/1970 | Dudley | 352/243 |
| 3,535,996 | 10/1970 | Winkler et al. | 352/243 |
| 3,539,253 | 11/1970 | Roppel | 352/243 |
| 4,281,909 | 8/1981 | Ishibashi et al. | 354/288 |
| 4,692,807 | 9/1987 | Kee | 354/82 |

FOREIGN PATENT DOCUMENTS

| 0203783 | 12/1986 | European Pat. Off. | 358/906 |
| 2330766 | 1/1975 | Fed. Rep. of Germany | 354/288 |

*Primary Examiner*—A. A. Mathews
*Attorney, Agent, or Firm*—Andrus, Sceales, Starke & Sawall

[57] ABSTRACT

A video camera comprises a camera body, a view finder part provided on one side surface of the camera body, a battery receiving part located on the one side surface of the camera body, and a battery which is detachably attached to the battery receiving part to function as a grip of the video camera.

11 Claims, 6 Drawing Sheets

VIDEO CAMERA HAVING GRIP CONSTITUTED BY BATTERY

BACKGROUND OF THE INVENTION

The present invention generally relates to video cameras, and more particularly to a video camera having a grip which is constituted by a battery.

Video cameras can generally be categorized into a first type which is used together with an independent video tape recorder (hereinafter simply referred to as a VTR) unit and a second type which has a built-in VTR. According to the first type, the video camera is an independent unit from the VTR unit, and the user must carry the VTR unit while picking up an image by the video camera which is connected to the VTR unit via a cable. Hence, in order to facilitate the operation of the video camera and eliminate the need to carry the bulky VTR unit, the second type has the built-in VTR which is compact. Since a camera body of the video camera and the compact VTR are in one-piece, the user can operate the video camera with ease.

In the video camera of the second type, a lens portion is provided at the front of the camera body, a cassette holder is provided generally in the central portion of the camera body, a battery holder is provided at the rear of the camera body, and a handle is provided on the camera body. The battery holder holds batteries which are used as a power source to the video camera. However, when the battery holder is provided at the rear of the camera body, there are problems in that the overall length of the video camera becomes long and the weight of the batteries may make it difficult for the user to hold the video camera in balance by the handle. In addition, the provision of the battery holder increases the overall size and weight of the video camera.

It is possible to provide the battery holder at a position other than the rear of the camera body, but even when the battery holder is provided at such a position that it would be more easier for the user to balance the video camera, this does not help reduce the overall size and weight of the video camera. The smaller and lighter the video camera is, the easier the operation of the video camera is for the user. Therefore, there is a demand for a video camera which is easy to balance and has reduced overall size and weight.

SUMMARY OF THE INVENTION

Accordingly, it is a general object of the present invention to provide a novel and useful video camera in which the problems described heretofore are eliminated and the described demand is satisfied.

Another and more specific object of the present invention is to provide a video camera comprising a camera body, a battery receiving part located on the one side surface of the camera body, and a battery which is detachably attached to the battery receiving part to function as a grip of the video camera. According to the video camera of the present invention, the video camera can easily be held in balance and the overall size and weight of the video camera can be reduced, because the battery itself is used as the grip and there is no need to provide a handle (or grip) independently of the battery.

Still another object of the present invention is to provide a video camera in which the battery receiving part is rotatably provided on the one side surface of the camera body, so that the inclination of the battery can be changed according to the needs. According to the video camera of the present invention, the video camera is extremely easy to operate and control since it is possible to change the inclination of the battery according to the situation and the user.

A further object of the present invention is to provide a video camera further comprising a view finder part provided on one side surface of the camera body, in which a portion of the view finder part can function as a portion of the grip. According to the video camera of the present invention, the video camera can be operated with ease regardless of the size of the user's hand, because a user with a small or average size hand can hold the video camera in balance by the battery alone and a user with a large hand can hold the video camera in balance by the battery and the portion of the view finder part.

Other objects and further features of the present invention will be apparent from the following detailed description when read in conjunction with the accompanying drawings.

DETAILED DESCRIPTION

First, a description will be given on a first embodiment of the video camera according to the present invention by referring to FIGS. 1 through 5. A video camera 11 generally comprises a camera body 12 having a cassette accommodating part 12a shown in FIG. 5 for accommodating a tape cassette, a view finder part 13 provided with a lens protecting barrier fixed on one side surface 12b of the camera body 12 at an upper portion thereof, and an optical lens system 14 provided on an upper portion of a front part 12c of the camera body 12 and is protected by an escutcheon 12d of the camera body 12. An eye cap 15 is provided on one end of the view finder part 13, and a protective glass 16 and a microphone 17 are provided on the other end of the view finder part 13.

Figure 3:
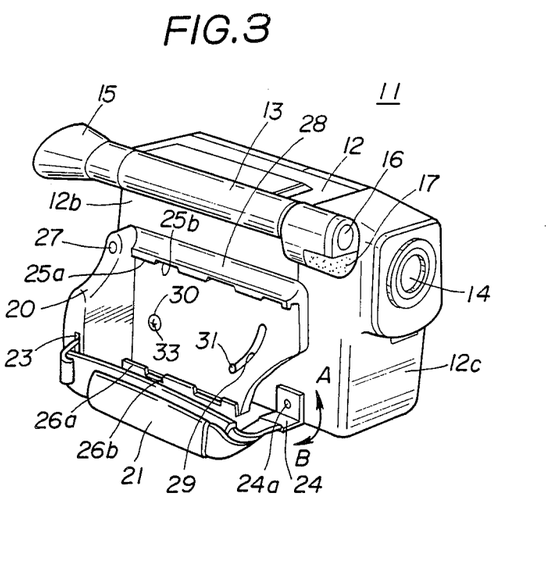
FIG. 3 is a perspective video showing the first embodiment of the video camera with a battery removed.
Figure 5:
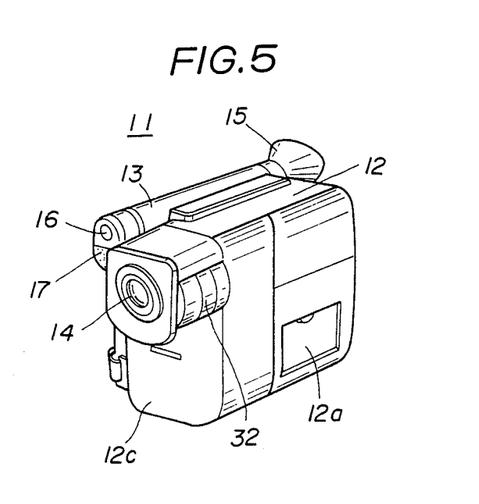
FIG. 5 is a perspective view showing the first embodiment of the video camera from an angle different from that of FIG. 1.

A battery receiving part 20 is located on the side surface 12b of the camera body 12 as shown in FIG. 3. An adjustable strap 21 is provided across the battery receiving part 20. One end of the adjustable strap 21 is fixed to the battery receiving part 20 via a groove 23, and the other end of the adjustable strap 21 is fixed to a rotary member 24. This rotary member 24 is rotatably supported by a pin 24a which is provided on the side surface 12b of the camera body 12. The length of the adjustable strap 21 is adjustable by known fastener means. A battery 22 is detachably attached to the battery receiving part 20 for the purpose of replacement or being recharged, and the battery 22 has such a shape that this battery 22 itself functions as the grip (or handle) of the video camera 11. Projections 25a and depressions 25b are provided on the upper portion of the battery receiving part 20, and projections 26a and depressions 26b are provided on the lower portion of the battery receiving part 20. An external power source terminal 27 and a hand rest part 28 are provided on the upper portion of the battery receiving part 20. In addition, an arcuate groove 29 and a circular hole 30 are formed in the battery receiving part 20, and a screw 31 provided on the side surface 12b of the camera body 12 fits into the arcuate groove 29. A power switch 32 for turning ON/OFF the power of the video camera 11 is provided at the side of the optical lens system 14 as shown in FIG. 5.

Next, a description will be given on the operation of attaching the battery 22 to the battery receiving part 20, by referring mainly to FIGS. 3 and 4. The battery receiving part 20 may be permanently fixed to the side surface 12b of the camera body 12. However, in the present embodiment, the battery receiving part 20 is rotatably mounted on the side surface 12b of the camera body 12 so that the user may adjust the angle of the grip (battery) with respect to the video camera 11 for his convenience.

As shown in FIG. 3, a screw 33 penetrates the circular hole 30 in the battery receiving part 20 and is fixed to the side surface 12b of the camera body 12. On the other hand, the screw 31 is fitted into the arcuate groove 29 which has a width larger than a neck diameter of the screw 31 so that the screw 31 can slide within the arcuate groove 29. As a result, the battery receiving part 20 is rotatable about the screw 33 which serves as a pivot when the screw 31 is loosened, so that the inclination of the battery receiving part 20 can be changed with respect to an optical axis of the optical lens system 14. When the desired inclination of the battery receiving part 20 is obtained, the screw 31 is tightened so as to fix the position of the battery receiving part 20 with respect to the camera body 12.

The rotary member 24 has a slot (not shown), and the other end of the adjustable strap 21 is fixed to the rotary member by inserting this other end into the slot. The rotary member 24 is rotatable about the pin 24a in directions A and B as indicated by arrows in FIG. 3.

Figure 1:
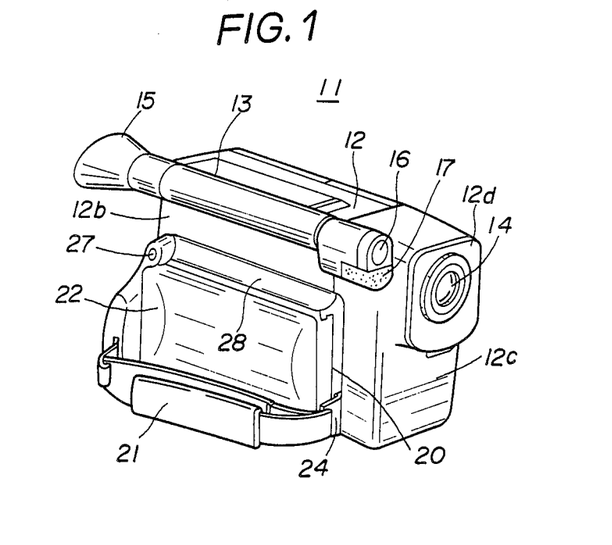
FIG. 1 is a perspective view showing a first embodiment of a video camera according to the present invention.
Figure 2:
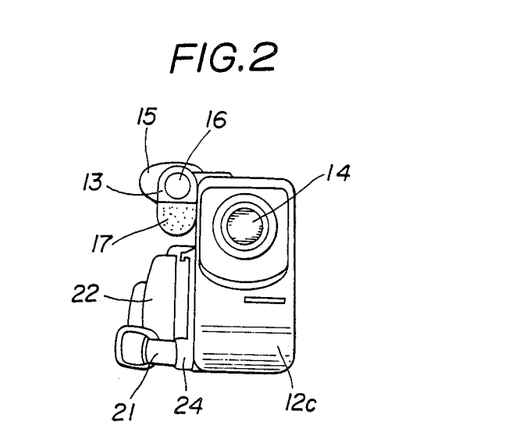
FIG. 2 is a front view showing the first embodiment of the video camera.

When attaching the battery 22 to the battery receiving part 20, the rotary member 24 is rotated in the direction B to the position where the rotary member 24 and the adjustable strap 21 are receded from a battery removal/insertion path as shown in FIG. 3, and the battery 22 is inserted generally rearward from the front part 12c of the camera body 12. As will be described later on in the present specification, the battery 22 is provided with depressions and projections corresponding to the projections 25a and 26a and the depressions 25b and 26b of the battery receiving part 20. Hence, the battery 22 is positioned in the battery receiving part 20 by fitting the depressions over the corresponding projections 25a and 26a and fitting the projections into the corresponding depressions 25b and 26b. When the battery 22 is positioned in the battery receiving part 20, the rotary member 24 is rotated in the direction A to the position where the rotary member 24 and the adjustable strap 21 block the battery removal/insertion path as shown in FIGS. 1 and 2. As a result, the battery 22 is positively prevented from escaping out of the battery receiving part 20 by the rotary member 24 and a portion of the adjustable strap 21.

As described before, the battery 22 has such a shape that this battery 22 itself functions as the grip (or handle) of the video camera 11. Hence, when a user with a small or average size hand inserts the hand between the battery 22 and the adjustable strap 21, the battery 22 fits nicely to the hand and the user can positively hold the video camera 11 in balance.

On the other hand, when a user with a large hand inserts the hand between the battery 22 and the adjustable strap 21, the battery 22 fits nicely to the palm of the hand and a portion of the view finder part 13 functions as a finger rest for the fingers, and the user can positively hold the video camera 11 in balance.

Since the battery 22 is held directly by the hand of the user, it is unnecessary to provide a positive cold protecting means for the battery 22 even when the video camera 11 is used in a cold environment. The warmth of the user's hand will provide protection for the battery 22 even when the video camera 11 is used in the cold environment, and the serviceable life of the battery 22 is extended thereby.

Because the battery 22 is provided on the side of the camera body 12, it is possible to minimize the overall length of the video camera 11. In addition, since the battery 22 functions as the grip of the video camera 11, it is easy to balance the video camera 11 and there will be virtually no burden on the user in balancing the video camera 11. Furthermore, there is no need to provide an extra unit of handle (or grip) independently of the battery 22 because the battery 22 itself is used as the grip of the video camera 11, and the weight of the video camera 11 can be reduced by an amount corresponding to the weight of the independent handle.

Figure 4:
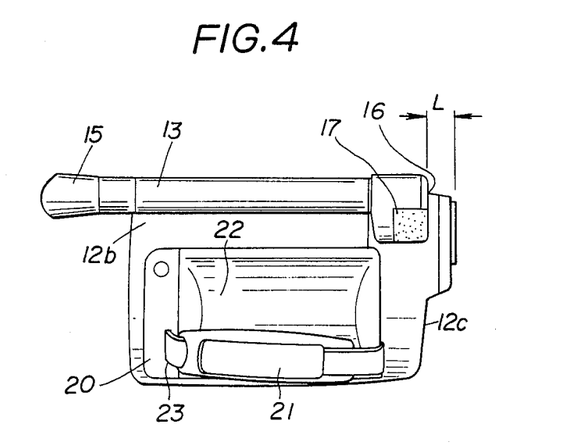
FIG. 4 is a side view showing the first embodiment of the video camera.

Moreover, the front of the optical lens system 14 and the front of the view finder part 13 (that is, the front of the protective glass 16 and the front of the microphone 17) are separated by a distance L as shown in FIG. 4. In other words, the protective glass 16 and the microphone 17 are located at positions receded from the front of the video camera 11 compared to the position of the optical lens system 14. For this reason, when the video camera is handled, there are less damage chances that the delicate microphone or the view finder front part hit other objects.

Next, a description will be given on a second embodiment of the video camera according to the present invention by referring to FIGS. 6 through 11. In FIGS. 6 through 11, those parts which are the same as those corresponding parts in FIGS. 1 through 5 are designated by the same reference numerals, and description thereof will be omitted. In the present embodiment, a video camera 41 has a construction which is basically the same as that of the video camera 11 described before, except that the view finder part 13 comprises a projection 13a which extends along the upper portion of the view finder part 13. As may be seen from FIG. 7, the projection 13a has a generally triangular cross section. Further, in the present embodiment, a battery 22A shown in FIGS. 10A through 10D is used. As in the case of the battery 22 used in the first embodiment, the battery 22A has such a shape that that this battery 22A itself functions as the grip (or handle) of the video camera 41. FIGS. 10A through 10D respectively are a perspective view, a front view, a plan view and a left side view showing the battery 22A.

Figure 10A:
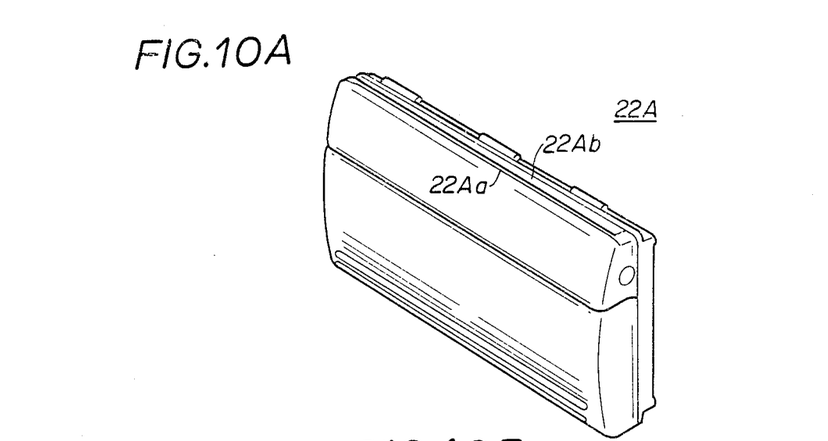
FIGS. 10A through 10D respectively are a perspective view, a front view, a plan view and a left side view showing an embodiment of the battery used in the second embodiment of the video camera.
Figure 10B:
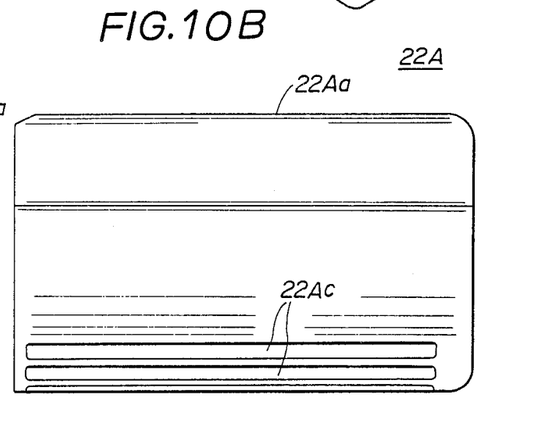
Figure 10C:
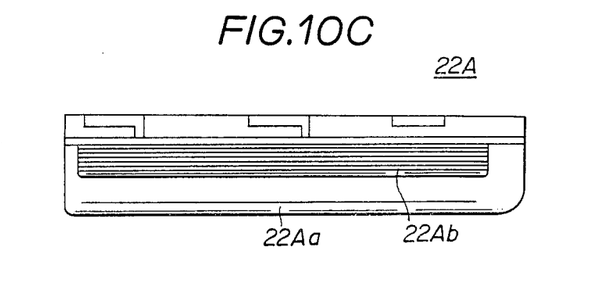
Figure 10D:
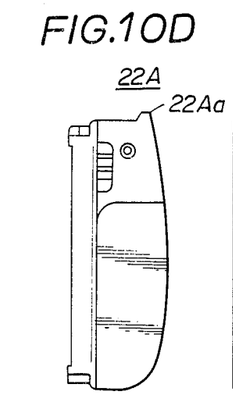

A projection 22Aa is formed on the top portion of the battery 22A along the longitudinal direction of the battery 22A, and an anti-slip part 22Ab is provided on the top of the battery 22A. As shown in FIG. 10C, the anti-slip part 22Ab comprises a rough surface such as projections and depressions formed along the longitudinal direction of the battery 22A. The projection 22Aa and the anti-slip part 22Ab cooperate to prevent slippage of the user's fingers due to sweat and the like. In addition, elongated grooves 22Ac are formed at the lower portion of the front of the battery 22A for similarly preventing slippage of the user's palm due to sweat and the like.

In the present embodiment, the grip of the video camera 41 is constituted by a lower grip portion 50 and an upper grip portion 51. The lower grip portion 50 is constituted by the battery 22A and especially the projection 22Aa, and the upper grip portion 51 is constituted by the projection 13a of the view finder part 13. As will be described hereunder, the user with the small or average size hand holds the video camera 41 by the lower grip portion 50. On the other hand, the user with the large hand holds the video camera 41 by the upper and lower grip portions 51 and 50.

Figure 6:
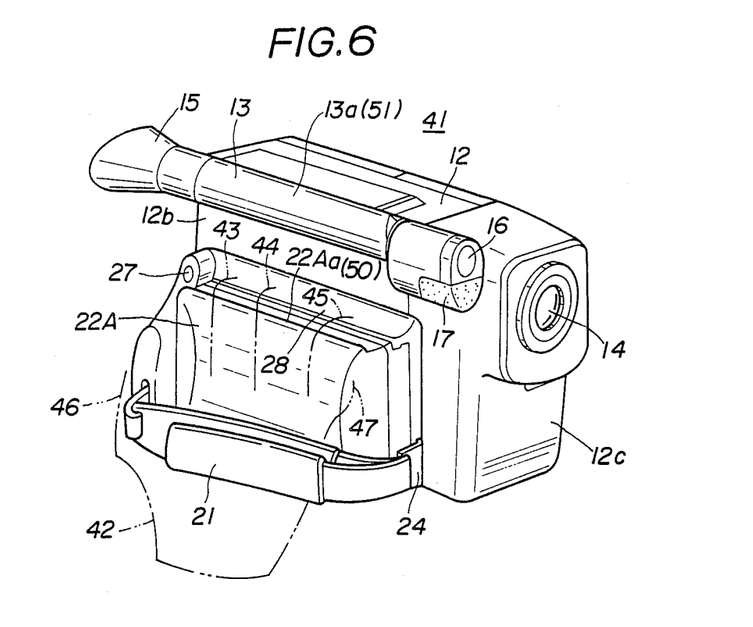
FIG. 6 is a perspective view showing a second embodiment of a video camera according to the present invention with a small or average size hand of a user indicated by a two-dot chain line.
Figure 7:
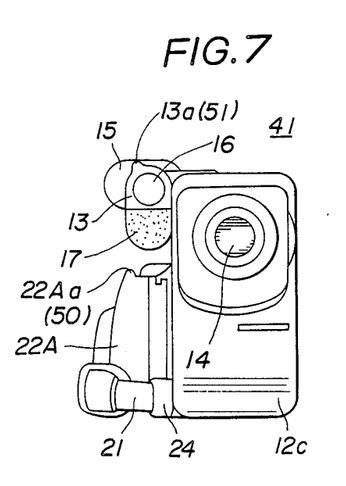
FIG. 7 is a front view showing the second embodiment of the video camera.
Figure 8:
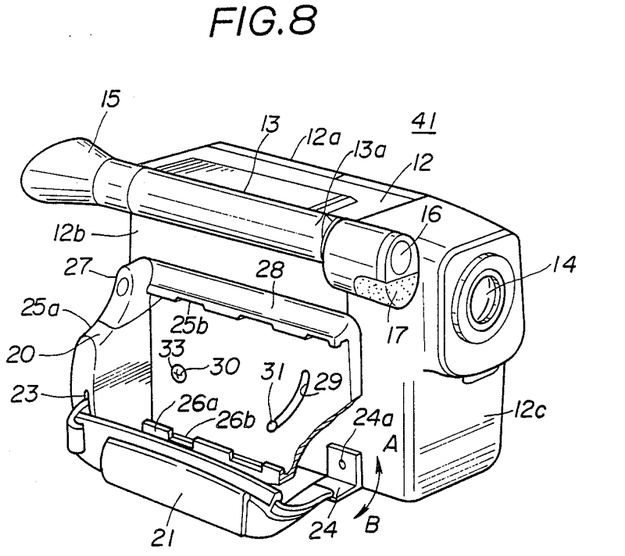
FIG. 8 is a perspective view showing the second embodiment of the video camera with a battery removed.
Figure 9:
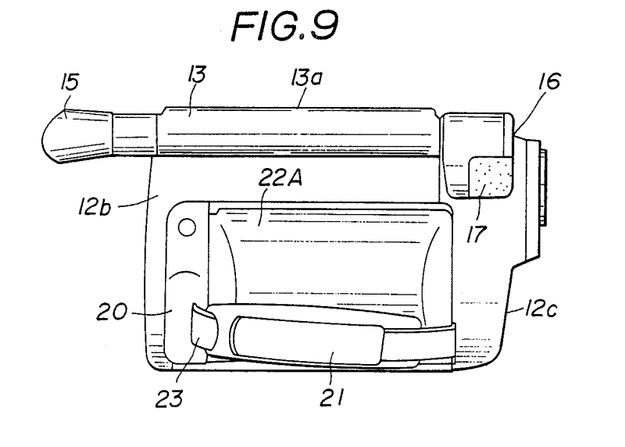
FIG. 9 is a side view showing the second embodiment of the video camera.

In FIG. 6, a small or average size hand 42 of the user is indicated by a two-dot chain line. The hand 42 is inserted between the adjustable strap 21 and the battery 22A, and an index finger 43, a middle finger 44 and a third finger 45 hold the projection 22Aa (lower grip portion 50) of the battery 22A. A thumb 46 and a little finger 57 are placed on the battery 22A at the positions shown in FIG. 6. Hence, the user with the small or average size hand 32 can stably and securely hold the video camera 41 by the battery 22A, that is, by the lower grip portion 50.

Figure 11:
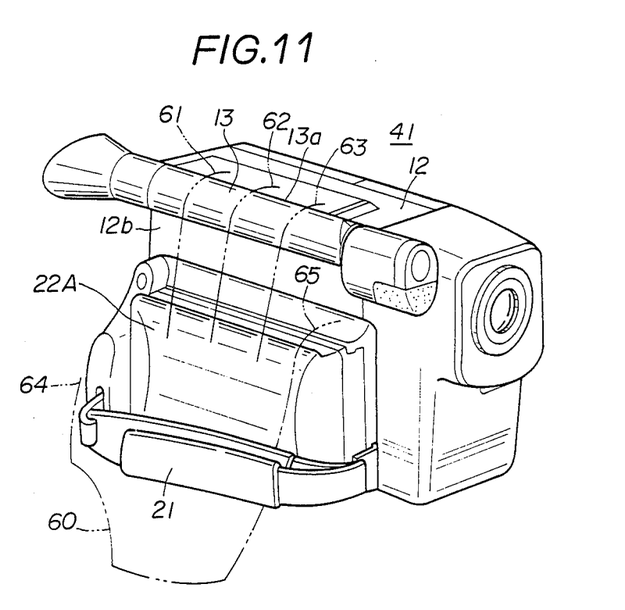
FIG. 11 is a perspective view showing the second embodiment of the video camera with a large hand of a user indicated by a two-dot chain line.

In FIG. 11, a large hand 60 of the user is indicated by a two-dot chain line. The hand 60 is inserted between the adjustable strap 21 and the battery 22A, and an index finger 61, a middle finger 62 and a third finger 63 hold the projection 13a (upper grip portion 51) of the battery 22A. A thumb 64 is placed on the battery 22A at the positions shown in FIG. 11, while a little finger 65 holds the projection 22Aa (lower grip portion 50) of the battery 22A. Hence, the user with the large hand 60 can stably and securely hold the video camera 41 by the upper and lower grip portions 51 and 50 of the video camera 41.

According to the second embodiment, it is possible to obtain the same effects as those obtainable in the first embodiment described before. In addition, since the projection 13a (upper grip portion 51) is used to provide a more positive grip, the video camera 41 can be operated easily even for the user having the large hand.

Figure 12:
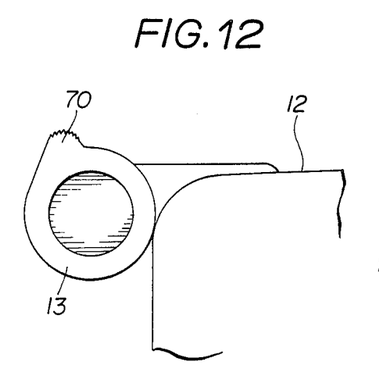
FIG. 12 is a partial front view showing a first modification of a view finder part.

FIG. 12 shows a first modification of the upper grip portion. According to this first modification, a projection 70 has a generally triangular cross section having a rounded top on which triangular projections and grooves extending along the longitudinal direction of the projection 70 are provided. These triangular projections and grooves on the rounded top function similarly to the anti-slip part 22Ab of the battery 22A, so as to prevent slippage when the user holds the projection 70.

Figure 13:
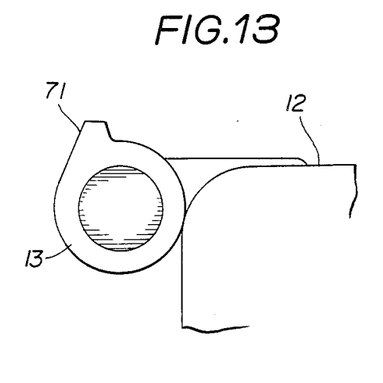
FIG. 13 is a partial front view showing a second modification of the view finder part.

FIG. 13 shows a second modification of the upper grip portion. According to this second modification, a projection 71 has a generally trapezoidal cross section, and edges of the flat top of the projection 71 prevent slippage when the user holds the projection 71.

When using an A.C. power source (not shown) to drive the video camera 11 (or 41), an A.C. adapter (not shown) is connected to the A.C. power source (for example, plugged into a wall socket) and a power supply cord (not shown) from the A.C. adapter is connected to the external power source terminal 27. Normally, the video camera 11 (or 41) is designed so that the circuits and the like are electrically disconnected from the battery 22 (or 22A) when the power supply cord is connected to the external power source terminal 27, and it is not essential to remove the battery 22 (or 22A) when using the A.C. power source.

However, it is also possible to design an A.C. adapter (not shown) which has approximately the same shape as the battery 22 (or 22). In this case, the A.C. adapter is attached to the battery receiving part 20 in place of the battery 22 (or 22A), and a power supply cord (not shown) from the A.C. adapter is connected to the A.C. power source. The A.C. adapter in this case functions as the grip of the video camera 11 (or 41).

In each of the embodiments described heretofore, the illustration and description of the electrical connection between the battery 22 (or 22A) and the battery receiving part 20 are omitted for convenience' sake, but it is evident that contacts are provided in the battery receiving part 20 for making electrical contact with plus and minus terminals of the battery 22 (or 22A).

Further, the present invention is not limited to these embodiments, and various variations and modifications may be made without departing from the scope of the present invention.

What is claimed is:

1. A video camera comprising:
   a camera body;
   a battery receiving part provided on a flank of said camera body; and
   a battery detachably attached to said battery receiving part, said battery constituting a grip of said video camera to support said camera body at the flank by exposing an exterior of said battery so that a substantial part of the battery is directly grasped when said video camera is held.

2. A video camera as claimed in claim 1 which further comprises a view finder part provided on the flank of said camera body above said battery receiving part, said view finder part comprising a projection which extends along a longitudinal direction of said view finder part to constitute an upper portion of the grip, and said battery constituting a lower portion of the grip.

3. A video camera as claimed in claim 2 in which said view finder part comprises a projection which extends along a longitudinal direction of said view finder part to constitute said portion of the grip.

4. A video camera as claimed in claim 2 which said projection comprises an anti-slip part for preventing slippage.

5. A video camera as claimed in claim 2 in which said projection has a generally triangular cross section.

6. A video camera as claimed in claim 2 in which said projection has a generally trapezoidal cross section.

7. A video camera as claimed in claim 1 in which said battery comprises an anti-slip part for preventing slippage, said anti-slip part being located on a top of said battery and extending along a longitudinal direction of said battery.

8. A video camera comprising:
a camera body;
a battery receiving part provided on a side surface of said camera body; and
a battery detachably attached to said battery receiving part, said battery constituting a grip of said video camera,
said battery receiving part being rotatably supported on the side surface of said camera body, so that an inclination of said battery is adjustable.

9. A video camera as claimed in claim 8 which further comprises a strap having one end fixed to said camera body and another end fixed to said battery receiving part.

10. A video camera comprising:
a camera body;
a battery receiving part provided on a side surface of said camera body;
a battery detachably attached to said batttery receiving part, said battery constituting a grip of said video camera; and
means for preventing said battery from escaping from said battery receiving part,
said means comprising a rotary member rotatably supported on said camera body, said rotary member in a first position preventing removal of said battery from said battery receiving part by blocking a battery removal path and in a second position permitting removal of said battery from said battery receiving part by receding from the battery removal path.

11. A video camera as claimed in claim 10 which further comprises a strap having one end fixed to said rotary member and another end fixed to said battery receiving part, said rotary member in said first position preventing removing of said battery from said battery receiving part by blocking the battery removal path together with said strap and in said second position permitting removal of said battery from said battery receiving part by receding from the battery removal path together with said strap.

* * * * *

UNITED STATES PATENT AND TRADEMARK OFFICE
CERTIFICATE OF CORRECTION

PATENT NO. : 4,772,902

DATED : September 20, 1988

INVENTOR(S) : Inoue et al

It is certified that error appears in the above-identified patent and that said Letters Patent is hereby corrected as shown below:

Column 6, line 67, delete claim 3

Column 7, line 3, "4" should read --3--
          line 6, "5" should read --4--
          line 8, "6" should read --5--
          line 10, "7" should read --6--
          line 15, "8" should read --7--
          line 25, "9" should read --8-- , and "8" should read --7--

Column 8, line 1, "10" should read --9--
          line 18, "11" should read --10--
          line 18, "10" should read --9--

Column 8, line 22, delete "removing" and substitute therefor ---removal---

On the title page, "11 Claims, 6 Drawing Sheets" should read
          --10 Claims, 6 Drawing Sheets--.

Signed and Sealed this

Third Day of September, 1991

*Attest:*

HARRY F. MANBECK, JR.

*Attesting Officer*          *Commissioner of Patents and Trademarks*